G. N. WOODRUFF.
LINTING MACHINE.
APPLICATION FILED NOV. 24, 1919.
1,349,179.
Patented Aug. 10, 1920.
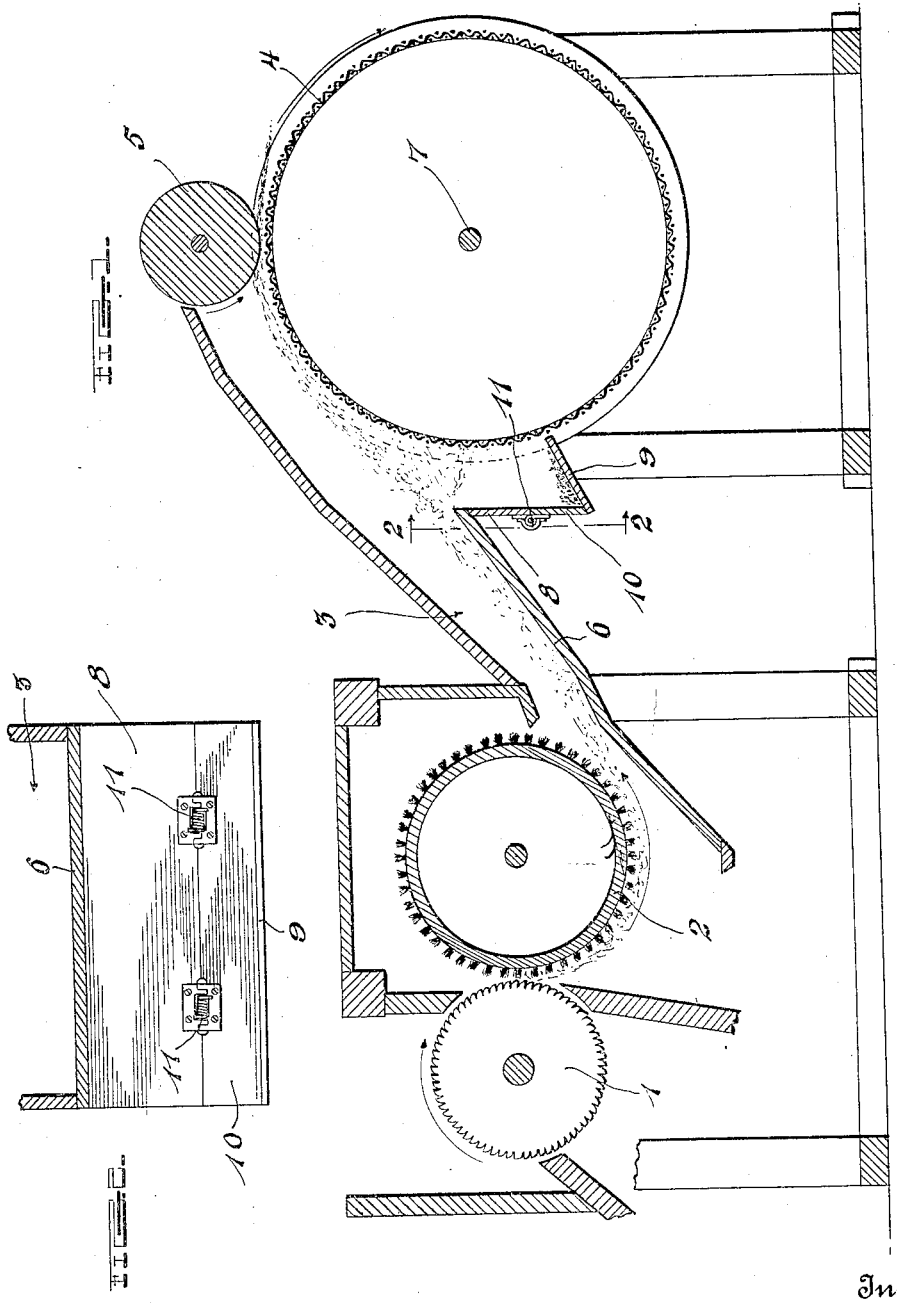
Witness
George W. Giovanetti
Inventor
G. N. Woodruff
By H. R. Willison & Co.
Attorneys

UNITED STATES PATENT OFFICE.

GEORGE N. WOODRUFF, OF HUGO, OKLAHOMA, ASSIGNOR OF ONE-HALF TO THOMAS D. BRUCE, OF PARIS, TEXAS.

LINTING-MACHINE.

1,349,179.

Specification of Letters Patent.　　Patented Aug. 10, 1920.

Application filed November 24, 1919. Serial No. 340,167.

*To all whom it may concern:*

Be it known that I, GEORGE N. WOODRUFF, a citizen of the United States, residing at Hugo, in the county of Choctaw and State of Oklahoma, have invented certain new and useful Improvements in Linting-Machines; and I do declare the following to be a full, clear, and exact description of the invention, such as will enable others skilled in the art to which it appertains to make and use the same.

My invention relates to improvements in linting machines and more particularly to those of the well known Carver type in which the cotton or other material is forced by air pressure through a passage against a rotary screen or condenser, the air escaping through such screen while the cotton or the like is matted on the latter. In linting machines of the type in question, the portion of the rotary screen exposed to use is restricted and hence the passage leading thereto often becomes clogged and a great deal of cotton is deposited at the inlet end of this passage instead of being forced entirely therethrough. My invention however has for its main object to overcome these principal difficulties by the provision of an air pocket at the outlet end of the cotton and air passage, the rotary screen operating at one side of this pocket as well as across the space in which said screen has heretofore received the cotton.

A further object of the invention is to so shape the air pocket as to form a dead air space therein in which seed and other foreign matter which would ordinarily be matted with the cotton, may be collected and discharged through a suitable door.

With the foregoing in view, the invention resides in the novel features of construction hereinafter described and claimed, the descriptive matter being supplemented by the accompanying drawing.

Figure 1 is a longitudinal section of a linting machine constructed in accordance with my invention.

Fig. 2 is a vertical transverse section on the plane of line 2—2 of Fig. 1.

In the drawing above briefly described, I have shown a linting machine consisting briefly of rotary saws 1, a rotary brush 2 for taking the cotton from said saws, a cotton outlet passage 3 inclining upwardly from the lower portion of said brush to receive the cotton from the latter, and a cylindrical rotary screen 4 operating across the delivery end of said passage. The brush 2 forces the cotton or the like up chute 3 and in addition creates a current of air which serves to carry the material to the screen 4, upon which it is deposited, the air escaping through said screen, while the cotton or the like clings to the latter and is operated upon by a roller or the like 5 to convert it into flat sheets which are cared for in any well known manner. On the ordinary Carver linting machine, the bottom 6 of the passage 3 extends directly to the screen 4 in approximately the same plane as the axis 7 of said screen and thus the portion of the screen exposed for receiving the cotton is so restricted as to cause clogging of said passage. In carrying out my invention, I terminate the upper end of the bottom 6 in spaced relation with the screen 4, extend a vertical wall 8 downwardly from said upper end of the bottom, and direct a supplemental bottom 9 from the lower edge of said wall 8 to the screen. The wall 8 and the bottom 9 coact in forming an air pocket which increases the area of the passage 3 at its delivery end, thereby exposing a greater portion of the screen 4 for the reception of the cotton, with the result that the difficulties above pointed out are effectively overcome.

In addition to the advantages just pointed out, the air pocket serves to collect any seeds or other foreign matter which strike the screen 4 and fall therefrom by gravity, and in order that such matter may gravitate to a point remote from the screen, the supplemental bottom 9 inclines downwardly from the screen to the lower edge of the wall 8. The lower portion of this wall may well be formed by a door 10 mounted in any preferred manner, as by spring hinges 11. By this provision, any foreign substances collecting in the air pocket may be discharged whenever required.

By constructing the device in the novel manner disclosed, it will be highly efficient and in every way desirable, serving to overcome a number of difficulties which have heretofore been encountered. I am aware that the passage 3 has heretofore been constructed with an enlarged outlet end, but the enlargement was not such as to provide an air pocket in which foreign matter would be collected and carried by gravitation to a point remote from the screen, thus preventing such matter from having any tendency whatever to clog said screen. Since probably the best results are obtainable from the exact arrangement shown, it is preferably followed, but within the scope of the invention as claimed, numerous minor changes may well be made.

I claim:

In a linting machine, the combination with an inclined passage; of a rotary screen operating across the upper delivery end of said passage, the bottom of said passage terminating at its upper end in spaced relation with said screen, at a point in approximately the same plane with the screen axis, a vertical wall extending from said upper end of said passage bottom, and an auxiliary bottom inclining downwardly from said screen to the lower edge of said wall, said wall and supplemental bottom coacting to form an air pocket exposing an increased portion of said screen for collection of the material passing through said passage and providing for trapping any foreign matter dropping from said screen, said pocket having a door by means of which the foreign matter may be discharged.

In testimony whereof I have hereunto set my hand.

GEORGE N. WOODRUFF.